(12) United States Patent
Seethaler

(10) Patent No.: US 7,271,893 B2
(45) Date of Patent: Sep. 18, 2007

(54) DEVICE AND METHOD FOR CHECKING THE LEVEL OF MOVING TRANSPARENT CONTAINERS

(75) Inventor: Bernd Franz Seethaler, Hamburg (DE)

(73) Assignee: KHS Metec GmbH, Niederzissen (DE)

( * ) Notice: Subject to any disclaimer, the term of this patent is extended or adjusted under 35 U.S.C. 154(b) by 382 days.

(21) Appl. No.: 10/474,577

(22) PCT Filed: Jan. 12, 2002

(86) PCT No.: PCT/EP02/00240

§ 371 (c)(1),
(2), (4) Date: Mar. 29, 2004

(87) PCT Pub. No.: WO02/084229

PCT Pub. Date: Oct. 24, 2002

(65) Prior Publication Data

US 2004/0149896 A1    Aug. 5, 2004

(30) Foreign Application Priority Data

Apr. 12, 2001 (DE) ................ 101 18 323

(51) Int. Cl.
*G01N 21/00* (2006.01)
(52) U.S. Cl. .................................. 356/239.6
(58) Field of Classification Search ............ 356/239.6, 356/427; 250/223 B, 577
See application file for complete search history.

(56) References Cited

U.S. PATENT DOCUMENTS

| 3,094,213 | A | * | 6/1963 | Wyman | 209/524 |
|---|---|---|---|---|---|
| 3,563,379 | A | * | 2/1971 | Stapf et al. | 209/524 |
| 4,108,762 | A | * | 8/1978 | Babunovic et al. | 209/524 |
| 4,312,341 | A | * | 1/1982 | Zissimopoulos et al. | 604/67 |
| 4,665,391 | A | * | 5/1987 | Spani | 340/619 |
| 5,486,693 | A | * | 1/1996 | Achter et al. | 250/223 B |
| 5,536,935 | A | * | 7/1996 | Klotzsch et al. | 250/223 B |

FOREIGN PATENT DOCUMENTS

| DE | 24 37 798 A1 | 2/1976 |
|---|---|---|
| DE | 31 28 094 A1 | 2/1983 |
| DE | 38 13 730 A1 | 5/1990 |
| GB | 969301 | 9/1964 |

* cited by examiner

Primary Examiner—Tarifur Chowdhury
Assistant Examiner—Isiaka O Akanbi
(74) Attorney, Agent, or Firm—Vidas, Arrett & Steinkraus P.A.

(57) ABSTRACT

Device for checking the fill level of moving transparent containers comprising
  at least one light sensitive sensor unit,
  a light source directed to the sensor unit, and
  an evaluation unit for sensor signals generated by the sensor unit,
whereas
  the sensor unit generates sensor signals depending on the position of a light beam on the sensor unit, and
  the evaluation unit determines from the temporal sequence of the sensor signals, whether the light beam was deflected by a container filled with a product.

16 Claims, 4 Drawing Sheets

Fig. 1
Fig. 2
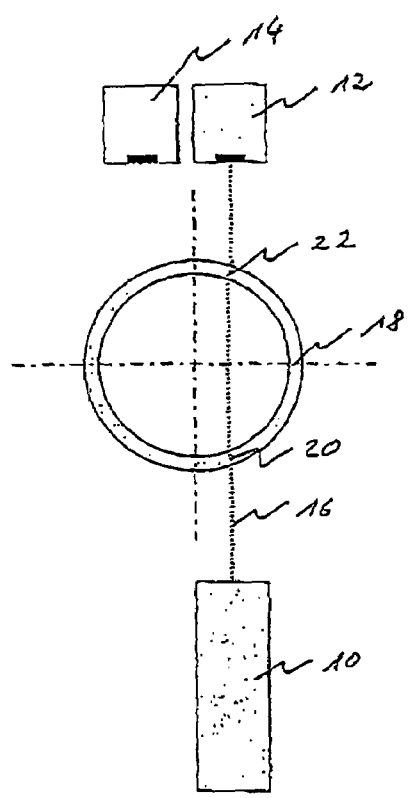
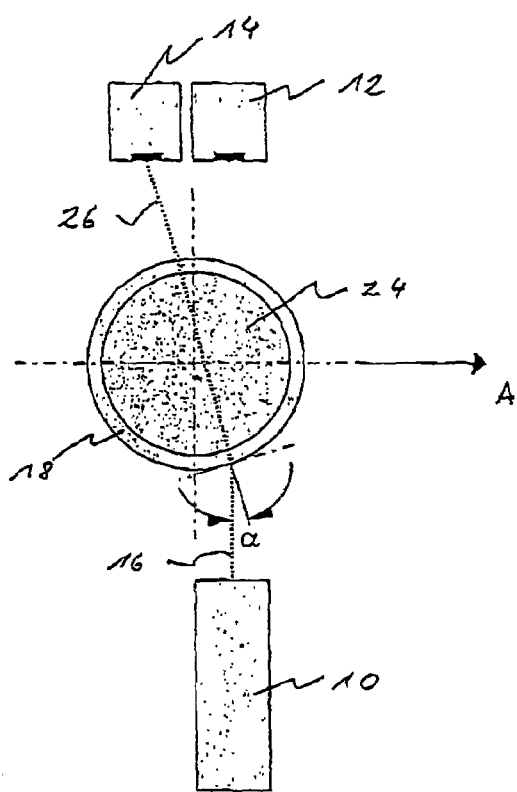

DEVICE AND METHOD FOR CHECKING THE LEVEL OF MOVING TRANSPARENT CONTAINERS

CROSS-REFERENCE TO RELATED APPLICATIONS

Not Applicable

STATEMENT REGARDING FEDERALLY SPONSORED RESEARCH

Not Applicable

BACKGROUND OF THE INVENTION

The invention relates to a device and a method for checking the level of moving, transparent containers.

DE 31 28 094 C2 discloses a method for measuring the level of transparent or translucent containers which are moved along a measuring station. The containers are sequentially subjected to a predetermined number of light flashes from an infrared laser wherein the light flashes exiting from the container in a predetermined area hit a photo cathode of a photo multiplier and are integrated to an output value. The integrated value allows to determine whether the light flashes passed through the container in an area filled with a product or in an area not filled with the product. The disadvantage of this method is that the speed of the conveyor belt has to been measured and the number of measured pulses depend on the geometry and the material of the container.

Object of the invention is to provide a device and a method for checking the level of moving transparent containers that allows an easy and reliable automatic control of the level of a product in moving containers.

BRIEF SUMMARY OF THE INVENTION

The device according to the invention comprises at least one light sensitive sensor unit, a light source directed towards the sensor unit and an evaluation unit for sensor signals of the sensor unit. The sensor unit generates sensor signals depending on the position of the measured light beam. For example the sensor signals may be generated by a light sensitive position sensor (PSD). In a construction easy to setup, the sensor unit comprises two sensors or sensor areas which generate independent of each other sensor signals. The light beam is directed to a first sensor or first sensor area, respectively. Therefore, the light beam impinges on the first sensor if the container is not located between the light source and the sensor. The light beam still impinges on the first sensor if the light beam is not deflected or only deflected by a small angle upon traveling through an empty area of the container. The second sensor or second sensor area is hit by a light beam that has been deflected by a container filled with a product. The evaluation unit calculates from the temporal sequence of the sensor signals whether the level in the container is reached or whether the level is not reached. Because of the refraction index of the product the light beam is deflected in the direction of movement of the container while the container is moved between light source and sensor unit. In the device according to the invention the light beam going through a filled container is deflected and impinges on the sensor unit in a different position. Therefore, the evaluation unit recognizes initially a sensor signal for the first position and thereafter a sensor signal for the second position. Because the evaluation unit evaluates the temporal sequence of the signals, the device according to the invention is independent of the absolute position of the containers and of further external influences. The term light radiation comprises electromagnetic radiation in the visible wavelength spectrum and ultraviolet radiation, infrared radiation as well as x-rays.

In a preferred embodiment of the invention three or more sensors or sensor areas are located with respect to the direction of movement of the containers before and behind the first sensor, which are hit by light beams deflected by the product filled to the container. Preferably three sensors are provided, the second sensor being located before the first sensor with respect to the direction of movement and the third sensor being located behind the first sensor with respect to the direction of movement. The sensors or sensor areas are arranged such that the moving containers come into a position relative to the light source in which the filled container deflects the light beam to the sensor or sensor area.

In an embodiment using three sensors the evaluation unit responds to the following temporal sequence of signals: second sensor, first sensor and third sensor. For this sequence of sensor signals the evaluation unit generates a signal indicating a sufficient level of a product in the container. An essential advantage of this method is that the sequence of sensor signals and, therefore, the checking of the level is independent of the geometry of the container and the speed of the conveyor belt. Furthermore the evaluation unit may respond to an error of the first sensor signal and check the existence of the sequence of sensor signals.

A preferred light source is a diode-laser module. The wavelength of the laser light is preferably such that the material of the container and the product is transparent for the laser light, for example the laser light may be chosen in the infrared spectrum.

In an preferred embodiment the light sensitive sensor unit comprises photo transistors and/or photo diodes.

In an alternative embodiment, the light sensitive sensor unit may comprise a CCD-chip or/and CCD-array of light sensitive photo elements wherein the sensor area is defined from the light sensitive photo elements.

In a further embodiment the height of the light source is adjustable with respect to the moving container. In this way the height of the fill level to be checked can be adjusted to different levels.

The underlying problem of the invention is also solved by a method comprising the features of claim 15.

In the method according to the invention the moving container is hit by a light beam in an area of a predetermined fill level height. A sensor unit measures the position of the light beams exiting from the container. An evaluation unit determines the temporal sequence of the light beams measured on the sensor unit. The light beam measured by the sensor unit moves because of the movement of the containers if there is a product filled into the container. The sensor unit may comprise a light sensitive position sensor and/or two or three sensors. The evaluation unit determines whether the light beam is deflected by an area of the container filled with the product and generates a corresponding signal.

BRIEF DESCRIPTION OF THE SEVERAL VIEWS OF THE DRAWINGS

A preferred embodiment of the device according to the invention is explained in detail with respect to the enclosed figures.

FIG. 1 shows a first embodiment of the device according to the invention with an empty container, FIG. 2 shows the device of FIG. 1 with a filled container.

DETAILED DESCRIPTION OF THE INVENTION

Figure 3:
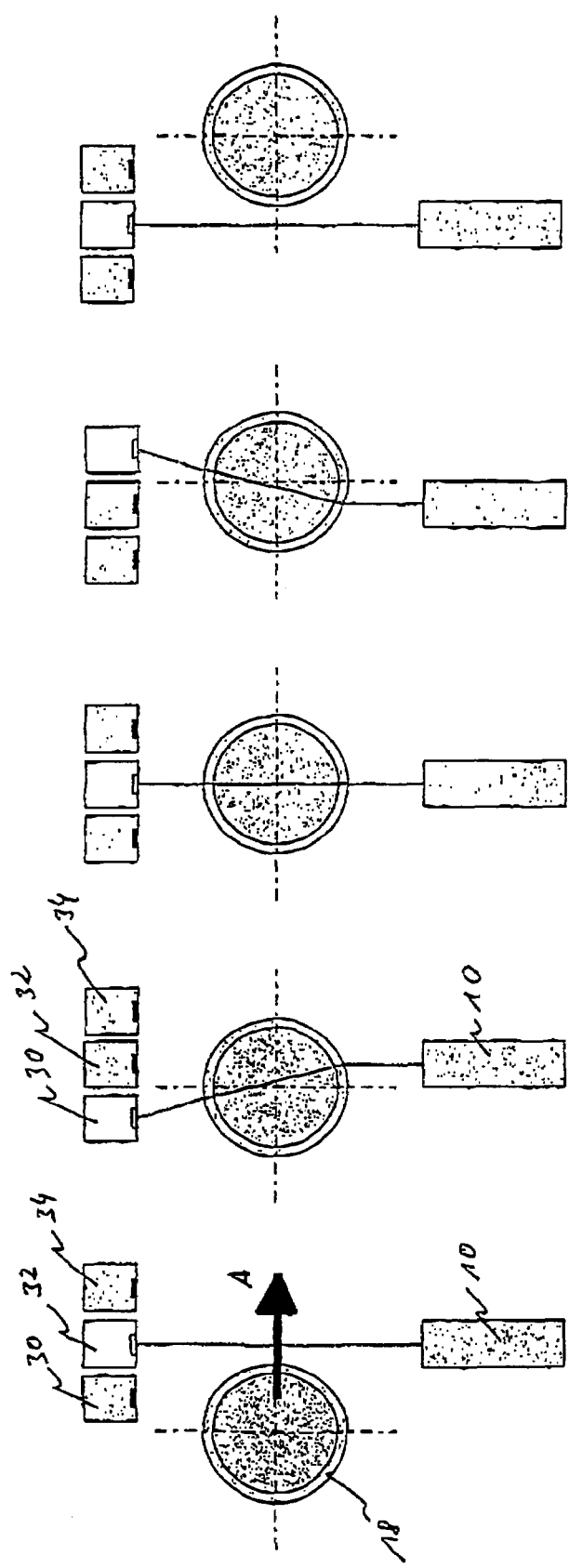
FIG. 3 shows the device according to the invention with three sensors and a filled container.

While this invention may be embodied in many different forms, there are described in detail herein a specific preferred embodiment of the invention. This description is an exemplification of the principles of the invention and is not intended to limit the invention to the particular embodiment illustrated.

With respect to FIG. 1, a light source 10 is located opposite to two sensors 12 and 14. The laser beam 16 of the laser 10 enters the container 18 in the point 20, travels through the container and exits from the container in the point 22. The travelling through the container material 18 shifts the laser beam within the container parallel relative to the laser beam 16 outside of the container. For a container 18 filled with air the laser beam 16 impinges on the first sensor 12. While the movement of the container 18 through the laser beam, the laser beam is essentially not deflected from its position on the first sensor.

FIG. 2 shows the situation in which the container is filled with a fluid 24. The laser beam 16 enters into the container 18 and is deflected by the angle α at the transition from the container material to the fluid 24. The deflected laser beam 26 therefore impinged on the second sensor 14. While the container 18 is moved in the direction of arrow A initially the sensor signal of the first sensor is provided. When the container 18 reaches the position shown in FIG. 2, the sensor signal of the second sensor 14 is generated. If the container 18 is in the center between laser 10 and sensor 12 there is no essential deflection of the laser beam, and the first sensor generates a signal. With the further movement of the container the laser beam is deflected in the direction of movement, therefore, subsequently no sensor signal will be generated. Based on the temporal sequence of the sensor signals and the lack of sensor signals, respectively, the evaluation units determines whether the container 18 is filled with a fluid.

FIG. 3 shows a preferred embodiment of the device according to the invention with three light sensitive sensors 30, 32 and 34 located opposite to the light source 10. While the filled container 18 moves between the laser and the light sensitive sensors, sensor signals of the sensors 30, 32 and 34 are subsequently generated. With other words, the direction of the light beam changes because of the changing entry angle of the laser beam into the container depending on the position of the container on a conveyor belt. This results in a moving light spot on the sensors. The evaluation electronics determines the direction of movement of the beam on the sensors and generates a signal indicating that the container is sufficiently filled if the light spot is moving in the direction A. In an alternative to the shown three sensors also a light sensitive position sensor may be provided that measures continuously the position of the light beam. When using light sensitive fields several fields can be combined to areas.

Figure 4:
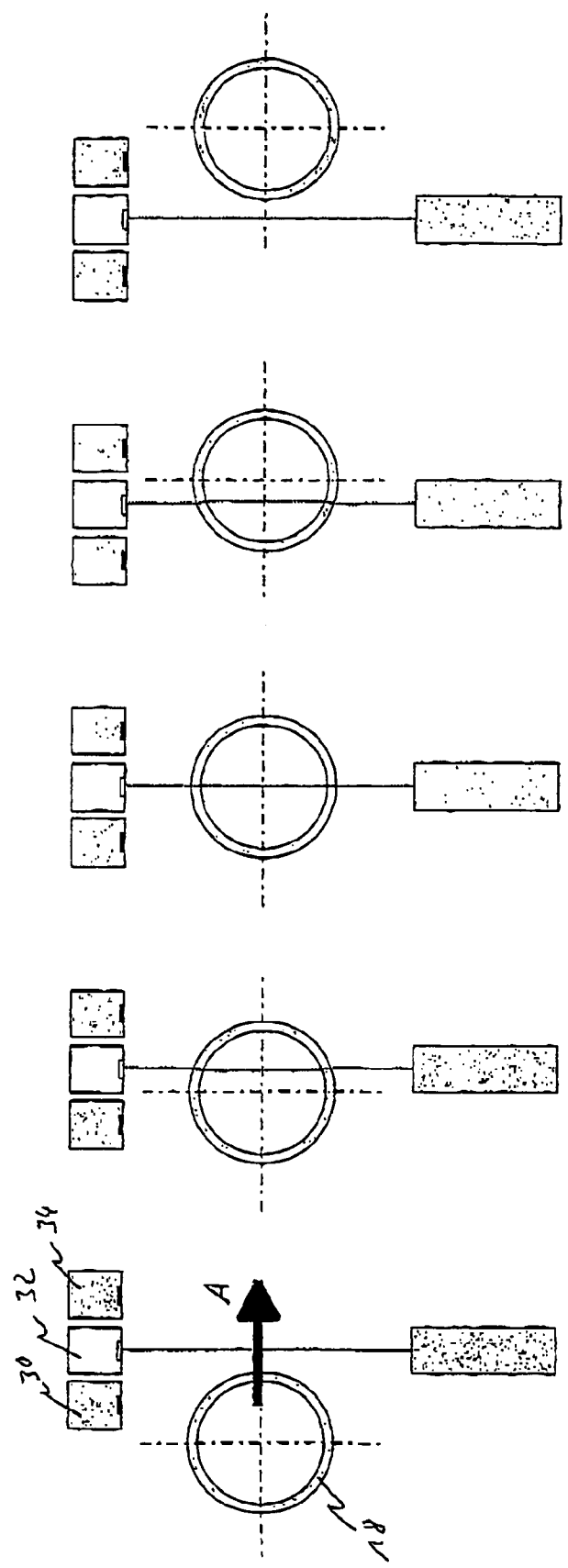
FIG. 4 shows the device of FIG. 3 with an empty container and FIG. 5 shows the device according to the invention integrated in a fill level checking device.

FIG. 4 shows the device of FIG. 3 with an empty container running there through the device. In this case the sensor 32 is activated over the entire time such that no signal indicating a sufficient fill level of the container 18 is generated.

Figure 5:
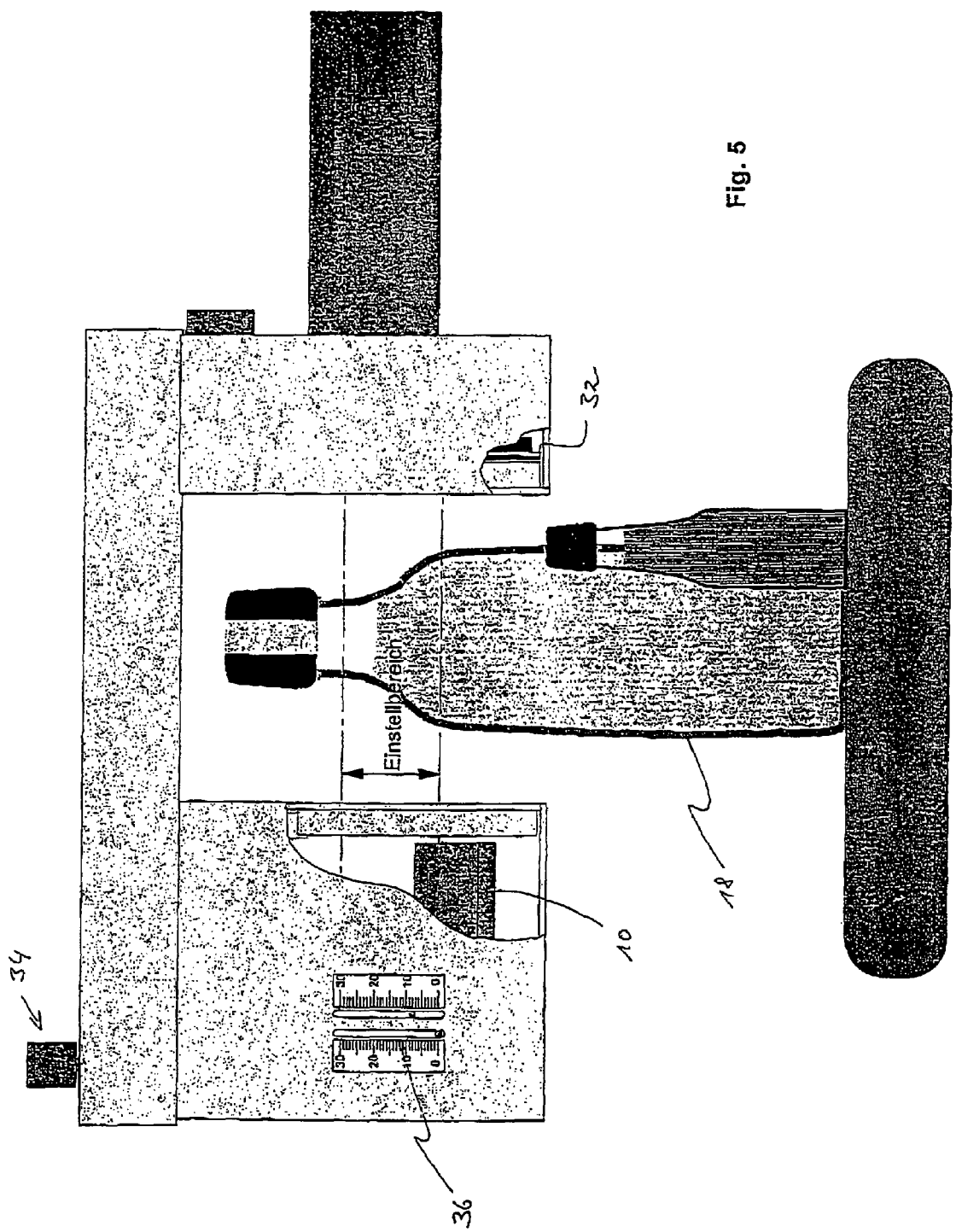

FIG. 5 shows the device according to the invention integrated into an apparatus for checking the fill level. The height of the light source 10 is adjustable by a altitude adjustment, not shown in the figure. The altitude adjustment for example can be provided by a turning knob on the upper side of the apparatus. For checking the fill level and the actual adjusted height a scale 36 is provided. The light sensitive sensor may extend in the direction of height adjustment or, in alternative, being adjustable in the height together with the light source. Furthermore, an image forming optic may be provided for the light sensitive sensors which focuses the entering light beam on a small sensor area, for example. The containers 18 to be checked are conveyed on a conveyor belt 38 through the apparatus. A sorting unit is connected to the evaluation unit wherein the sorting unit sorts out bottles not sufficiently filled if for these bottles no signal indicating a sufficient level is generated by the evaluation unit. The bottles are conveyed on a conveyor belt 38 along the light source 10. In order to check the maximum filling and a minimal filling two light sources may be provided above each other. In order to evaluate the light signals of the two light sources with common sensor units independent of each other the light sources are trigged alternating to each other.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims. Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

The invention claimed is:

1. Device for check in the level of moving transparent containers comprising
    at least one light sensitive sensor unit,
    a light source directed to the sensor unit, and
    an evaluation unit for sensor signals generated by the
       sensor unit, characterized in that the sensor unit generates sensor signals depending on the position of a light beam on the sensor unit, and the evaluation unit determines from the temporal sequence of the sensor signals, whether the light beam was deflected by a container filled with a product.

2. Device according to claim 1, characterized in that the light sensitive sensor unit comprises a light sensitive position sensor (PSD) indicating the position of incident light beams.

3. Device according to claim 1, characterized in that the sensor unit comprises two sensors or two sensor areas adapted to generate sensor signals independent of each other wherein a light beam is directly directed on a first sensor or first sensor area and the light beam impinges on the second sensor or second sensor area if it is deflected by a container filled with a product.

4. A device for checking the level of moving transparent containers comprising:

at least one light sensitive sensor unit, a light source directed to the sensor unit, and an evaluation unit for sensor signals generated by the at least one sensor unit, wherein:

at least one sensor unit generates sensor signals depending on the position of a light bean on the at least one sensor unit, the evaluation unit determines from the temporal sequence of the sensor signals whether the light beam was deflected by a container filled with a product, the at least one sensor unit comprises at least three sensor areas one being a first sensor area, one being a second sensor area, and one being a third sensor area, each sensor area comprises at least one sensor, each sensor area is adapted to generate sensor signals independent of each other, wherein a light beam is directly directed on a first sensor area and the light beam impinges on the second sensor area if it is deflected by a container filled with a product, the tree sensor areas being in three different positions, at least the second and the third sensor areas are located in at least one relative position selected from the list consisting of: before the first sensor area with respect to the direction of movement of the transparent container and behind the first sensor area with respect to the direction of movement of the transparent container, and wherein the light beams deflected by a container filled with the product impinge on the three different areas in a temporal sequence.

5. Device according to claim 4, characterized in that three sensor areas are provided, wherein a second sensor area is provided before the first sensor area with respect to the direction of movement of a transparent bottle and a third sensor area is provided behind the first sensor area with respect to the direction of movement of a transparent bottle.

6. Device according to claim 5, characterized in that the evaluation unit generates a signal indicating a sufficient level in the container in response to the following sequence of sensor signals: second sensor area, first sensor area, and third sensor area, respectively.

7. Device according to claim 6, characterized in that the evaluation unit generates the signal indicating a sufficient level of the transparent container in response to a missing first sensor signal for the said sequence of signals.

8. Device according to claim 3 characterized in that the light sensitive sensor unit comprises photo transistors and/or photo diodes.

9. Device according to claim 3 characterized in that the light sensitive sensor unit comprises a CCD-chip or a CCD-array of light sensitive photo elements, wherein the sensor area is defined by areas of the light sensitive photo elements.

10. Device according to claim 1 characterized in that a diode-laser module is provided as light source.

11. Device according to claim 10, characterized in that the diode-laser module provides light at a wavelength such that the container material and the product are transparent.

12. Device according to claim 1 characterized in that the light source is adjustable in its height relative to the moving containers.

13. Device according to claim 1 characterized in that two light sources are provided in different height relative to the moving containers.

14. Device according to claim 13, characterized in that the light sources are directed to a common sensor unit wherein the light sources alternatingly direct a light beam to the common sensor unit.

15. Method for controlling the level of moving, transparent containers comprising the following steps:

directing a light beam to the moving container in an area of a predetermined fill level height, a sensor unit measures the position of the light beam going through the container, and an evaluation unit determines from the temporal sequence of the light beams measured by a sensor unit whether the light beam was deflected by the moving container filled with a product.

16. Method according to claim 15, characterized in that the evaluation unit responds to a temporarily changing position of the measured light beams in the direction of movement of the container and generates a signal indicating the sufficient level of the container.

* * * * *